Aug. 24, 1948.     M. HYMAN, JR     2,447,805
COMPOSITE RESINOUS SHEET OF BIREFRINGENT
MATERIAL AND METHOD OF MAKING THE SAME
Filed April 11, 1945

INVENTOR.
Mark Hyman, Jr.
BY Donald L. Brown
Attorney

Patented Aug. 24, 1948

2,447,805

UNITED STATES PATENT OFFICE 2,447,805

COMPOSITE RESINOUS SHEET OF BIRE-
FRINGENT MATERIAL AND METHOD OF
MAKING THE SAME

Mark Hyman, Jr., Cambridge, Mass., assignor to
Polaroid Corporation, Cambridge, Mass., a cor-
poration of Delaware Application April 11, 1945, Serial No. 587,685

8 Claims. (Cl. 88—65)

This invention relates to optical elements, and more particularly to new and improved birefringent optical elements and methods of producing the same.

It is one object of the invention to provide a method for producing optically useful films by the simultaneous co-evaporation and deposition in a vacuum of a plurality of organic compounds, and particularly to provide such a process wherein one of said compounds is a transparent organic material whose molecules contain orientable, substantially planar, optically anisotropic groupings such as benzenoid rings and wherein another of said compounds is an organic resin of relatively low molecular weight.

Another object is to provide novel optical elements produced by means of the method of the invention, and particularly to produce a transparent film of substantial thickness which is optically isotropic for light normally incident thereon and highly birefringent for obliquely incident light.

Figure 1:
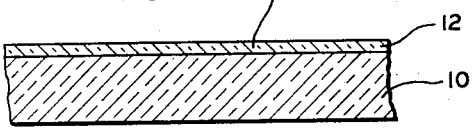
Figure 2:
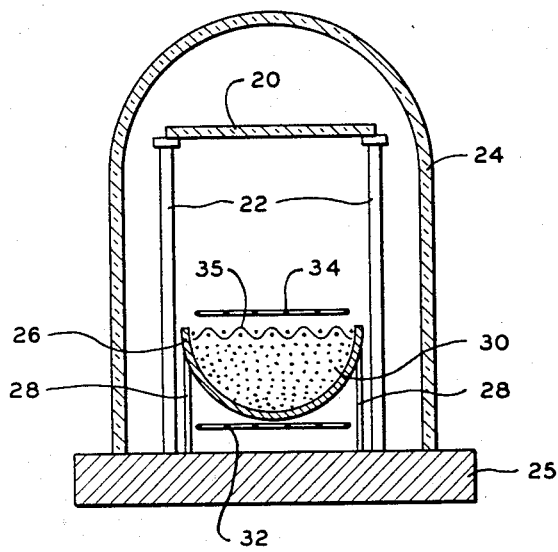

Additional objects and advantages will in part appear and in part be pointed out in the course of the following detailed description of several embodiments of the invention, which are given as non-limiting examples, in connection with the acompanying drawings, in which:

Figure 1 is a sectional view illustrating diagrammatically an embodiment of the invention; and Figure 2 is a sectional view illustrating diagrammatically apparatus suitable for producing the embodiment of the invention shown in Fig. 1.

The present invention is directed to the production of optically useful films of organic material characterized by high birefringence and by maximum transparency and strength in relatively substantial thicknesses. It is particularly concerned with the production of such films which will have the optical properties of a basal section of a uniaxial crystal, and which will therefore be optically isotropic for light normally incident thereon but birefringent for obliquely incident light. Such a film may be produced, for example, by the evaporation and deposition in high vacuum of an organic compound such as isophthalic or terephthalic acid having substantially flat, optically anistropic molecules. In accordance with the present invention it has been discovered that films of similar optical characteristics but greatly improved properties with respect to both clarity and strength can be produced by simultaneously evaporating and depositing in a vacuum one or more such compounds together with a gum-like substance such as a synthetic organic resin of relatively low molecular weight or the like.

In the drawings, Fig. 1 illustrates a supporting plate 10 of glass or other suitable material having thereon a transparent, birefringent film 12 formed in accordance with the invention, and Fig. 2 illustrates apparatus suitable for use in the preparation of film 12 which is a heterogeneous mixture of the evaporated and deposited resinous substance together with other transparent materials, at least one of which is an organic compound the molecules of which are in the form of substantially planar, optically anisotropic groupings and are so oriented as to render said film optically isotropic for light normally incident thereon, and birefringent for light oqliquely incident thereon, the optic axis of said film being disposed perpendicularly to the film surface. Plate 20 in Fig. 2 corresponds to element 10 in Fig. 1 and is illustrated as mounted on any suitable supports 22 within bell jar 24, mounted on any suitable base plate 25. It will be understood that any suitable means, not shown, may be provided for evacuating bell jar 24, and maintaining the desired high vacuum therein during the evaporation process. Crucible 26 may be formed from a non-heat-conduting material such as porcelain or a heat-conducting metal such as stainless steel or nickel, in which case it may be insulated from base plate 25 in any suitable manner, as for example by means of legs 28 of porcelain or other relatively non-heat-conducting material. The charge 30 of material to be evaporated is placed within crucible 26 and heat applied thereto by means of filaments 32 and 34 of any suitable metal and shape, a spiral shape having been found desirable. Filaments 32 and 34 may be supported in any way as by means of the lead wires thereto, not shown, and element 35 represents a relatively fine wire screen, the purpose of which will be described hereinafter.

In practicing the invention with the apparatus shown in Fig. 2 it is desirable first to mix the materials to be evaporated. The factors affecting the selection of said materials are discussed in detail hereinafter, but for the initial explanation of the invention an illustrative example of a suitable charge is a mixture of five parts by weight of isophthalic acid and one part of polyindene. After the charge is placed in crucible 26, bell jar 24 should be evacuated, and it is important that evacuation be as complete as possible and that the vacuum be maintained at a high level throughout the evaporation process. Two factors contribute to this requirement. The first is that in the practice of the present invention there is at least a slight tendency to decomposition of the charge at the temperature of evaporation, and this tendency increases with temperature. At the same time, any decomposition results in a lowering of the vacuum, which in turn raises the temperature necessary for evaporation and hence encourages more rapid decomposition, and these effects are cumulative unless any decomposition products are removed as rapidly as they form. The other factor is related to the same problem and is that organic molecules generally tend to hold a substantial amount of entrapped air or gas which will be released during evaporation and will thereby similarly reduce the vacuum and encourage decomposition. A vacuum as high as $10^{-6}$ mm. of mercury is desirable and for preferred results it should not be permitted to drop below $10^{-4}$ mm. of mercury.

After the desired degree of vacuum is obtained, the next step is to apply heat to crucible 26 and charge 30, and it is during this stage of the process that some of the advantages of the present invention become apparent. It appears that optimum results from the standpoint of uniformity and clarity are obtained when the charge vaporizes and deposits on plate 20 in units as small as possible, i. e., molecules or groups of a very small number of associated molecules. When the vaporization is not uniform there is a tendency for the vaporizing material to carry up with it particles of substantially greater than molecular size, and they in turn contribute to loss of clarity and uniformity in the deposited film. In the above example, it will be found that the polyindene melts to a viscous liquid before appreciable vaporization begins. This liquid in turn not only facilitates the uniform and rapid transfer of heat throughout the remainder of the charge, but it also serves as a sort of dampening agent to retain the more or less powdery isophthalic acid against sputtering during evaporation. This results in two further advantages: a given evaporation rate may be maintained at substantially lower temperatures than would otherwise be the case, owing to the higher degree of uniformity in heating, and the elimination of sputtering facilitates evaporation at still higher temperatures, which in turn means a substantial increase in the rate of depositing the desired film on plate 20. The preferred operating range of temperature for the process of the invention will vary with different materials and mixtures, but this feature of the invention makes temperature control substantially less critical. Thus, for example, although isophthalic acid will evaporate alone at approximately 285 to 290° C. and polyindene alone will evaporate in a vacuum at a lower temperature, evaporation and deposition of the above mixture thereof can be carried on at temperatures as high as 335° C. without undue decomposition.

It should be understood that any factor aiding uniformity of evaporation will aid in the homogeneity of the deposited film. For example, uniformly rapid heating of the charge is aided by the use of a heat-conducting crucible and also by the use of the plurality of filaments 32 and 34 in Fig. 2. Another precaution is the provision of screen 35 to trap any particles of appreciable size which might otherwise be carried up to plate 20. Said screen is preferably of relatively fine mesh, such for example as a 200-mesh screen of bronze or stainless steel wire. Still other factors affecting uniformity are the distance and angular relation between plate 20 and crucible 26, which are dependent upon a number of variables. It is desirable to prevent the temperature of the plate from rising too high, approximately 60 to 65° C. being the preferred upper limit, and the plate should therefore not be placed too near the crucible, from 3½ to 4 inches being a preferred minimum distance. It is also preferred that the vaporized particles from the crucible deposit on the plate at as nearly normal incidence as possible, and the relative positions of the plate and crucible should be determined accordingly. For example, if the plate is positioned directly over the crucible as in Fig. 2, its lower surface should be substantially parallel with the top of the crucible and at a distance therefrom which is determined to a considerable extent by their relative sizes. The rate of deposition on any point on the plate is approximately inversely proportional to the square of the distance between said point and the crucible. It follows that the distance between plate and crucible should be correspondingly increased for plates of substantially greater area than the top of the crucible in order that the rate of deposition be as nearly uniform as possible over the entire surface of the plate. If there is a material departure from these conditions, the deposited film may be of non-uniform thickness or the optic axis therein may be non-uniformly disposed, or both of these effects may occur.

When the above example of the process of the invention is carried out as described, there will be formed on plate 20 a substantially glass-clear film possessing the optical properties of a basal section of a uniaxial crystal. That is to say, said film will be optically isotropic for normally incident light but will exhibit birefringence of a very high order for obliquely incident light, for example a maximum upwards of 0.30. It is particularly significant that said film is uniaxial in spite of the fact that isophthalic acid normally occurs in the form of biaxial crystals. Moreover, this result is not limited to isophthalic acid but has been found to take place with other biaxial crystalline materials with which the present invention may be practiced, examples of which are given hereinafter.

The thickness of the above film may be readily controlled either visually, if a transparent bell jar is used, or by means of any suitable measuring or control device such as a photoelectric measuring device, and as a practical matter control to substantially constant results may be readily obtained by standardizing the conditions of temperature and time. The temperature of evaporation depends to a considerable extent upon the particular material being evaporated and may also vary within the safe operating range as explained above. For a given material and temperature, the time necessary to deposit a film of a given thickness depends on the distance between the crucible and the supporting plate, as is also explained above. As a specific example, if charge 30 comprises the above mixture of isophthalic acid and polyindene and if plate 20 is approximately two inches in diameter and is positioned approximately four inches above and parallel with the top of crucible 26, a film having a thickness of the order of 0.005 inch may be deposited in as little time as 25 to 30 minutes from the time when heat is first applied to the charge. Said film will be self-supporting and substantially less brittle than a similar film of isophthalic acid alone or mixed with another crystalline compound such, for example as terephthalic acid. It will also adhere quite firmly to glass plate 20 and will preferably be retained thereon in use.

The optical anisotropy of the above film may be explained on the basis that the vaporized charge deposits on plate 20 in such manner that the benzenoid rings of the isophthalic acid are oriented parallel to the surface of the plate and hence parallel to the surfaces of the film, which readily accounts for the birefringence of the film as well as the direction of its optic axis. Furthermore, examination of said film by X-ray diffraction reveals a pattern characteristic of a fibrous structure, with the fibre axis perpendicular to the plane of the film, and the conclusion is that the film is composed of a multiplicity of microcrystals of isophthalic acid adhered through the polyindene to form a substantially homogeneous structure wherein said microcrystals are all oriented parallel to a common direction perpendicular to the plane of the film. In addition to the above noted strength contributed to the film by the polyindene, there is a marked improvement in optical clarity over films composed either of a material such as isophthalic acid alone or mixed with a similar crystalline material. In these latter cases a much higher degree of control over the conditions of evaporation is necessary to prevent the formation of haze in any but extremely thin films, but in the practice of the present invention this problem is reduced to a minimum.

The invention is subject to considerable modification and may be practiced with a wide variety of materials in a wide variety of proportions. It appears that the highest degree of birefringence in the deposited film is obtained when the charge comprises at least one compound whose molecules contain substantially planar, optically anisotropic groupings such, for example, as aromatic rings of the benzene type. It also appears important that the characteristics of said molecules be such that said anisotropic groupings are readily orientable when the compound is treated in accordance with the invention. This result is apparently most readily obtained when the molecules themselves are substantially rigidly planar, as in the case of isophthalic and terephthalic acids. It will be seen that this is in accordance with the above discussion of the optical properties of the films of the invention as deriving from uni-planar molecular orientation, and particularly satisfactory results from this aspect have been obtained with benzene derivatives and similar aromatic compounds. Isophthalic acid is a preferred material because of its extremely high birefringence, which is of the order of 0.40, but many other materials have also been found suitable and illustrative examples include terephthalic acid, uracil, melamine, strychnine, uric acid and xanthine. In general, satisfactory results may be obtained with any compound whose molecules are suitably orientable and anisotropic, including non-cyclic compounds having planar molecules which contain unsaturated linkages, and it is to be understood that all specifically mentioned materials are given only by way of illustration and are not to be construed as in any way limiting the scope of the invention. Films of particularly high birefringence have been obtained with compounds whose molecules contain polar groups, such as the carboxyl and amino groups in the above-noted examples of suitable materials. The presence of such groups appears to influence the deposition of the evaporated molecules in the desired uni-planar orientation. It also appears desirable to utilize a plurality of birefringent compounds in the charge, further improvement in clarity having been noted when this is done. For example, one such mixture with which highly satisfactory results have been obtained comprises approximately 6 parts isophthalic acid, 2 parts terephthalic acid and 1 part polyindene. All such mixtures are to be understood as coming within the scope of the invention.

Many other compounds of similar properties may be used in place of polyindene without departing from the scope of the invention, and certain requirements in this connection may be definitely stated. The preferred materials are organic resins of sufficiently low molecular weight to withstand evaporation without substantial decomposition, a molecular weight of the order of 1000 being an approximate upper limit, but it is to be understood that this is a practical and not a theoretical limitation, and any corresponding definition in the claims is to be given as broad a construction as the practice of the invention permits. Synthetic resins appear preferable to natural gums, which decompose more readily. It is desirable that the coefficient of thermal expansion of the resin match as closely as possible that of the birefringent constituents of the charge, since otherwise the film may be subject to severe strain and cracking under conditions of substantial temperature change. Another consideration already noted is the desirability of choosing a compound fusible at a temperature near but lower than the evaporation point of the birefringent constituents. Another important factor is the evaporation point of the resin, as will be discussed in more detail hereinafter. It is desirable but not essential to utilize materials which are relatively vitreous and also which are optically isotropic either inherently or under the conditions of use in the practice of the invention. Some examples of suitable specific materials include hydrogenated polyindenes, polyvinyl acetates of sufficiently low molecular weight such as those sold under the tradename "Gelva," the compounds sold under the tradenames "Nevillite V" and "Nevillite 123," products of The Neville Company, Pittsburgh, Pennsylvania, and esters of abietic acid such as glyceryl triabietate, sold under the tradename "ester gum," and ethylene glycol diabietate. It is to be understood that these specific examples are given merely as illustrative of the different types of compound with which the invention may be practiced.

The relative proportions of the different materials in the charge are not critical and depend in part upon the particular materials to be evaporated. It is generally desirable to use as small a proportion of the resin constituent as is compatible with maximum transparency in the finished film, for example one part to from five to ten parts of the birefringent constituent, for two reasons. One is that when the film contains an excess of resin it tends to become increasingly more brittle and fragile. The other is that since the birefringence of the film derives from its birefringent constituents, the greater proportion of the latter, the higher the birefringence will be. There is also a relation between the composition of the charge and the operating temperature and composition of the deposited film. In the preferred case all constituents of the charge will have substantially a common evaporation point, and the film will then have substantially the same composition as the charge.

irrespective of the rate and temperature of evaporation. If said constituents have different evaporation points, the degree to which the composition of the film coincides with that of the mixture will depend to a considerable extent upon the temperature and rate of evaporation, as will be apparent on considering the two extreme cases.

The first case is that in which the constituents of the charge are wholly immiscible in the solid phase, or liquid phase if they melt before evaporation. Under equilibrium conditions their partial pressures will be additive, and the mixture will begin to evaporate at a temperature lower than the constituent of the charge having the lowest evaporation point and will continue to evaporate at a constant relative rate in accordance with their molecular weights as long as some of each material is present and irrespective of the initial proportions in the charge. The other extreme case is that wherein the different constituents of the charge form a substantially single phase. Under equilbrium conditions the substantially pure constituent having the lowest evaporation point will begin to evaporate first, and the compositions of the vapor and film will change progressively until they finally comprise the substantially pure constituent having the highest evaporation point. Since the establishment of equilibrium conditions requires slow heating, it follows that the more rapidly the evaporation is carried out, the more nearly will the charge tend to vaporize like a pure compound and the more nearly the composition of the vapor and film will coincide with that of the charge. This will be true irrespective of the degree of miscibility of the constituents of the charge, and it may accordingly be stated as a general rule that for preferred results the evaporation should be carried out by bringing the entire charge rapidly to as high a temperature as the danger of decomposition permits and maintaining said temperature until a film of the desired thickness is obtained.

The films of the invention are preferably retained in use on the plate whereon they are formed or otherwise protected as by lamination. The invention is not limited to the use of glass as the support whereon the above films are formed. Any of a variety of other material may be used, such for example as methyl methacrylate, polystyrene, or other similar organic resins, provided they remain sufficiently rigid under the conditions of evaporation. Other respects in which the practice of the invention may be modified are in the evaporation apparatus and method. It is not essential that the charge be evaporated as a mixture, although this does give better control of proportions. On the other hand, comparable results may be obtained under some conditions by simultaneously evaporating two or more compounds each from a separate crucible, although this may require more careful control of temperature and the rates of evaporation. In a further modification of the invention, there may be evaporated and deposited a series of thin layers as described above but utilizing different materials in each layer. For example, such a composite film may comprise a multiplicity of thin layers of substantially pure isophthalic acid alternating with a multiplicity of layers of polyindene or some other suitable resin. In this embodiment each individual layer may be controlled to the maximum thickness at which adequate transparency is maintained and the composite film built up to the desired ultimate thickness. Still further variations of the above evaporation technique will doubtless be apparent to those skilled in the art and all such modifications are to be construed as coming within the scope of the invention.

Since certain changes in carrying out the above process, and certain modifications in the product which embody the invention may be made without departing from its scope, it is intended that all matter contained in the above description, or shown in the accompanying drawing shall be interpreted as illustrative and not in a limiting sense.

What is claimed is:

1. As a new product, an optical element comprising in combination means providing a supporting surface and a substantially uniform solid film adhering to said surface, said film comprising an intimate mixture of an evaporatable polyindene resin and minute particles of isophthalic acid, the particles of said acid being present in said film in oriented condition whereby said film exhibits an X-ray diffraction pattern characteristic of a fibrous structure with the fiber axis at a predetermined angle to said supporting surface, said particles being oriented with a corresponding optical direction thereof in substantial parallelism with said fiber axis, said film being optically isotropic for light incident thereon in a direction parallel to said fiber axis and being birefringement for light incident thereon at angles to said fiber axis.

2. As a new product an optical element comprising in combination means providing a supporting surface and a substantially uniform solid film adhering to said surface, said film comprising an intimate mixture of an evaporatable polyindene resin and minute particles of isophthalic acid, the particles of said acid being present in said film in oriented condition whereby said film exhibits an X-ray diffraction pattern characteristic of a fibrous structure with the fiber axis being perpendicular to said supporting surface, said particles being oriented with a corresponding optical direction thereof in substantial parallelism with said fiber axis, said film being optically isotropic for light incident thereon in a direction parallel to said fiber axis and being birefringent for light incident thereon at angles to said fiber axis.

3. As a new product, an optical element comprising in combination means providing a supporting surface and a substantially uniform solid film adhering to said surface, said film comprising an intimate mixture of an evaporatable polyindene resin and minute particles of a compound selected from the group consisting of isophthalic acid and terephthalic acid the particles being present in said film in oriented condition whereby said film exhibits an X-ray diffraction pattern characteristic of a fibrous structure with the fiber axis at a predetermined angle to said supporting surface, said particles being oriented with a corresponding optical direction thereof in substantial parallelism with said fiber axis, said film being optically isotropic for light incident thereon in a direction parallel to said fiber axis and being birefringent for light incident thereon at angles to said fiber axis.

4. As a new product, an optical element comprising in combination means providing a supporting surface and a substantially uniform solid film adhering to said surface, said film comprising an intimate mixture of an evaporatable polyindene resin and minute particles of terephthalic acid, the particles of terephthalic acid being present in said film in oriented condition whereby said film exhibits an X-ray diffraction pattern characteristic of a fibrous structure with the fiber axis at a predetermined angle to said supporting surface, said particles being oriented with a corresponding optical direction thereof in substantial parallelism with said fiber axis, said film being optically isotropic for light incident thereon in a direction parallel to said fiber axis and being birefringent for light incident thereon at angles to said fiber axis.

5. As a new product, an optical element comprising in combination means providing a supporting surface and a substantially uniform solid film adhering to said surface, said film comprising an intimate mixture of an evaporatable polyindene resin and minute particles of isophthalic acid and terephthalic acid, the particles of said acids being present in said film in oriented condition, said particles being oriented with a corresponding optical direction thereof in substantial parallelism and perpendicular to said supporting surface, said film being optically isotropic for light incident thereon in a direction normal to said supporting surface and being birefringent for light incident thereon at angles to said normal direction.

6. In the process of forming a transparent optical element, the steps comprising evaporating an intimate mixture comprising substantially one part of a polyindene resin and five parts of isophthalic acid in the form of minute particles, in a vacuum and at a temperature of from 285° to 335° C., and causing the resulting vapor to deposit on a supporting surface of transparent sheet material in the form of an intimate mixture of minute particles with a corresponding optical direction oriented in substantial parallelism and perpendicular to a surface of the optical element, the resultant material deposited having a maximum birefringence of at least 0.30.

7. In the process of forming a transparent optical element, the steps comprising simultaneously evaporating a mixture of substantially one part of a polyindene resin, six parts of isophthalic acid and two parts of terephthalic acid at a temperature of approximately 285° to 335° C. and in a vacuum of at least $10^{-4}$ mm. of mercury, and causing the resulting vapor to deposit on a supporting surface of transparent sheet material in the form of an intimate mixture of minute particles with a corresponding optical direction oriented in substantial parallelism and perpendicular to a surface of the optical element, the resultant material deposited having a maximum birefringence of 0.30.

8. As a new product, an optical element comprising in combination means providing a supporting surface and a substantially uniform solid film adhering to said surface, said film comprising an evaporatable polyindene resin and an intimate mixture of minute particles of isophthalic acid and terephthalic acid, the particles of said acids being present in said film in oriented condition, said particles being oriented with a corresponding optical direction thereof in substantial parallelism and perpendicular to said supporting surface, said film being optically isotropic for light incident thereon in a direction normal to said supporting surface and being birefringent for light incident thereon at angles to said normal direction and having a maximum birefringence of 0.30 for light incident thereon at angles to said fiber axis.

MARK HYMAN, Jr.

REFERENCES CITED

The following references are of record in the file of this patent:

UNITED STATES PATENTS

| Number | Name | Date |
|---|---|---|
| 1,235,037 | Judson | July 31, 1917 |
| 1,886,234 | Meissner | Nov. 1, 1932 |
| 1,928,105 | Kern | Sept. 26, 1933 |
| 1,950,907 | Staud et al. | Mar. 13, 1934 |
| 2,011,553 | Land | Aug. 13, 1935 |
| 2,046,476 | Meissner | July 7, 1936 |
| 2,077,699 | Kline | Apr. 20, 1937 |
| 2,123,902 | Land | July 19, 1938 |
| 2,233,442 | Wiley | Mar. 4, 1941 |
| 2,306,222 | Patnode | Dec. 22, 1942 |
| 2,328,219 | Land | Aug. 31, 1943 |
| 2,346,247 | Bailey et al. | Apr. 11, 1944 |
| 2,352,085 | Dimmick | June 20, 1944 |
| 2,378,476 | Guelick | June 19, 1945 |

OTHER REFERENCES

McNally et al, article in Journal of Phy. Chem., vol. 34, Jan.–June 1930, pages 165, 169, 170.

Blodgett article in Phy. Review, vol. 51, June 1, 1937, pages 964, 968, 969, 970.

Spence article in Jour. of Phy. Chem., vol. 43, Oct. 1939, pages 865, 870 to 874, and 878.